(12) United States Patent
Semper et al.

(10) Patent No.: US 6,546,001 B1
(45) Date of Patent: Apr. 8, 2003

(54) MEDIUM ACCESS CONTROL MESSAGE ACKNOWLEDGMENT SYSTEM AND METHOD OF OPERATION THEREOF

(75) Inventors: William J. Semper, Dallas, TX (US); Hyunseok Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/134,252

(22) Filed: Aug. 14, 1998

(51) Int. Cl.[7] .............................. H04J 3/24; H04L 12/56
(52) U.S. Cl. ........................................ 370/349; 370/389
(58) Field of Search ................................ 370/349, 356, 370/376, 379, 389, 392, 395.4, 471, 474; 455/434, 450, 515

(56) References Cited

U.S. PATENT DOCUMENTS

| | | | | |
|---|---|---|---|---|
| 5,384,777 A | * | 1/1995 | Ahmadi et al. | 370/85.2 |
| 5,519,706 A | * | 5/1996 | Bantz et al. | 370/85.3 |
| 5,592,468 A | * | 1/1997 | Sato | 370/252 |
| 5,638,371 A | * | 6/1997 | Raychaudhuri et al. | 370/347 |
| 5,644,576 A | * | 7/1997 | Bauchot et al. | 370/437 |
| 5,655,219 A | * | 8/1997 | Jusa et al. | 370/338 |
| 5,666,348 A | * | 9/1997 | Thornberg et al. | 370/230 |
| 5,684,791 A | * | 11/1997 | Raychaudhuri et al. | 37/278 |

* cited by examiner

*Primary Examiner*—Alpus H. Hsu
*Assistant Examiner*—Toan Nguyen

(57) ABSTRACT

There is disclosed for use in a wireless communications device, a medium access control (MAC) message acknowledgment system for acknowledging MAC messages transmitted in an RF control channel between the wireless communications device and a remote communications unit. The MAC message acknowledgment system comprises a control processor capable of receiving an outbound MAC message unit from a MAC layer device in the wireless communications device and attaching a header to the outbound MAC message unit to thereby form an outbound MAC message suitable for transmission to the remote communications unit, the header comprising logic bits identifying the outbound MAC message unit to the remote communications device to thereby enable the remote communications unit to acknowledge receipt of the outbound MAC message.

20 Claims, 4 Drawing Sheets

MEDIUM ACCESS CONTROL MESSAGE ACKNOWLEDGMENT SYSTEM AND METHOD OF OPERATION THEREOF

TECHNICAL FIELD OF THE INVENTION

The present invention is directed, in general, to wireless communication networks and, more specifically, to a system for providing reliable delivery of medium access control (MAC) messages over the air interface of a wireless communication network.

BACKGROUND OF THE INVENTION

Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population. As a result, wireless subscribers use a wide variety of wireless devices, including cellular phones, personal communication services (PCS) devices, and wireless modem-equipped personal computer (PCs), among others.

To maximize usage of the available bandwidth, a number of multiple access technologies have been implemented to allow more than one subscriber to communicate simultaneously in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

Generally, a multiple access wireless system uses dedicated control channels to establish, to maintain, and to break down a connection between a subscriber's mobile device (also called "mobile unit" or "mobile station") and the wireless system. The control channel signals transmitted between the base transceiver stations of the wireless system and the mobile units are generally referred to as medium access control (MAC) messages. The MAC layers of the base transceiver stations and the mobile units are the lower half of the data link layer that defines topology dependent access control protocols in a communication network. The MAC layer specifies the message frame formats as well as the conditions for accessing the traffic channels of the wireless network.

MAC messages are transmitted in a forward control channel from a base transceiver station to one or more mobile units and in a reverse control channel from the mobile station to the base transceiver station. At the start of a wireless telephone call or data transmission, the MAC messages establish a connection and assign the subscriber to a selected traffic channel. Once the connection is established, the subscriber and the base transceiver station exchange voice and/or data signals via the selected traffic channel. MAC messages are used to maintain the connection and to handle any hand-offs that are performed between base transceiver stations.

The performance and reliability of a wireless network is at least partially determined by the reliability with which MAC messages are exchanged between mobile units and base transceiver stations in the wireless network. If a MAC, message is lost in transmission or received out-of-sequence due to the loss of another MAC message, the wireless network typically must re-transmit at least one, and usually several, of the MAC messages in order to compensate for the one or more lost MAC messages.

There is therefore a need in the art for wireless networks that provide more reliable communications between mobile units and base transceiver stations in the wireless network. In particular, there is a need in the art for wireless networks that exchange MAC messages in a more reliable manner.

SUMMARY OF THE INVENTION

To address the above-discussed deficiencies of the prior art, it is a primary object of the present invention to provide, for use in a wireless communications device, a medium access control (MAC) message acknowledgment system for acknowledging MAC messages transmitted in an RF control channel between the wireless communications device and a remote communications unit. In one embodiment of the present invention, the MAC message acknowledgment system comprises a control processor capable of receiving an outbound MAC message unit from a MAC layer device in the wireless communications device and attaching a header to the outbound MAC message unit to thereby form an outbound MAC message suitable for transmission to the remote communications unit, the header comprising logic bits identifying the outbound MAC message unit to the remote communications device to thereby enable the remote communications unit to acknowledge receipt of the outbound MAC message.

In another embodiment of the present invention, the MAC message acknowledgment system further comprises a timer coupled to and controllable by the control processor, wherein the timer stores a delay period the MAC message acknowledgment system will wait before re-transmitting the outbound MAC message.

In still another embodiment of the present invention, the MAC message acknowledgment system further comprises a memory coupled to and controllable by the control processor, wherein the control processor stores the outbound MAC message in the memory if a receipt of a previously transmitted MAC message has not been acknowledged by the remote communications unit.

In yet another embodiment of the present invention, the wireless communications device is a mobile device.

In a further embodiment of the present invention, the wireless communications device is a base transceiver station in a wireless network.

In a yet further embodiment of the present invention, the control processor is capable of receiving from a transceiver an inbound MAC message transmitted by the remote communications unit.

In a still further embodiment of the present invention, the control processor detects an embedded header in the received inbound MAC message and uses the embedded header to acknowledge to the remote communications unit a receipt of an embedded MAC message unit in the received inbound MAC message.

In yet another embodiment of the present invention, the control processor modifies a header in a second outbound MAC message in order to acknowledge receipt of the received inbound MAC message.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communications network.

Figure 1:
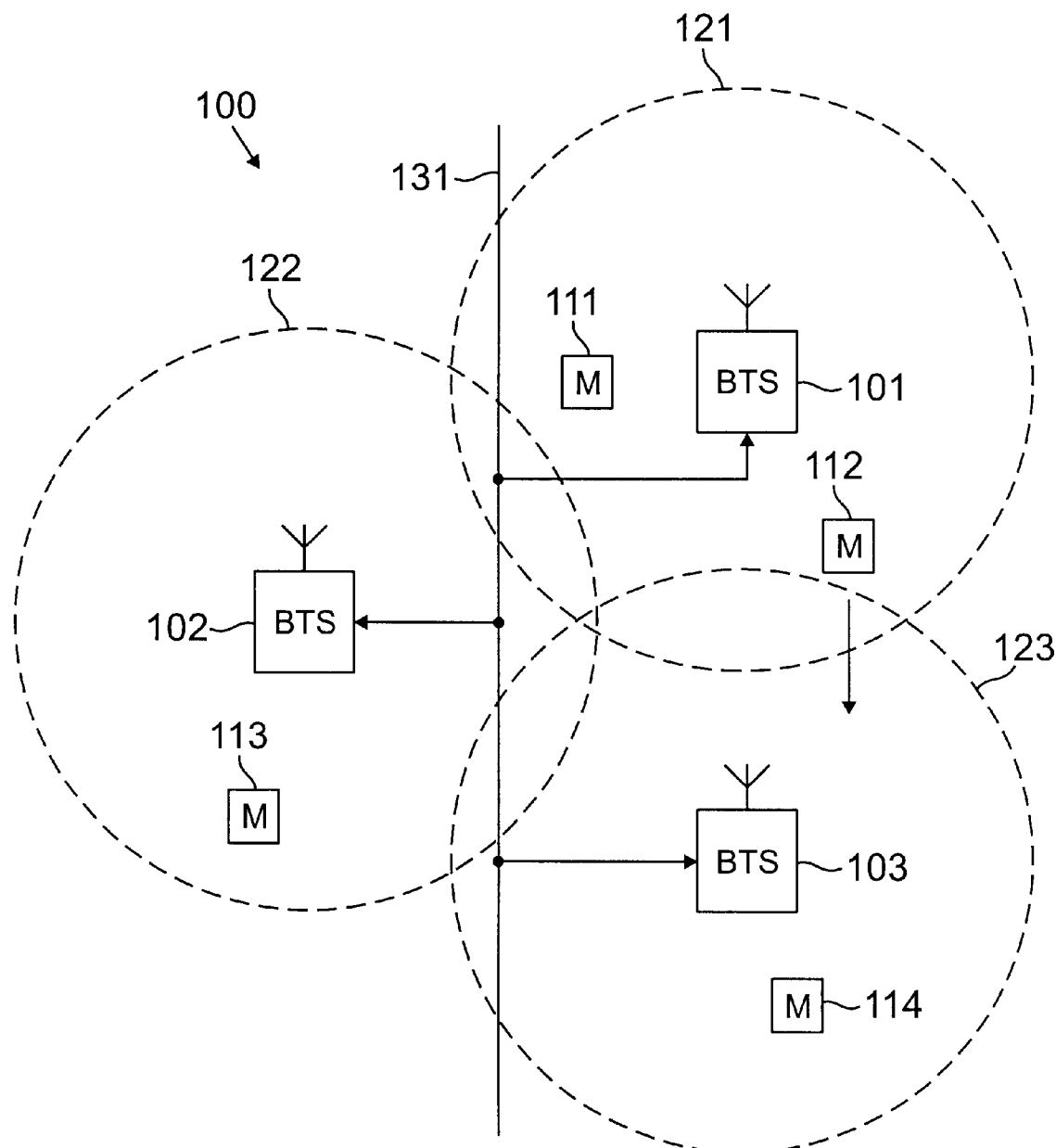
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base transceiver stations, BTS 101, BTS 102, or BTS 103. In a preferred embodiment of the present invention, the wireless telephone network 100 is a CDMA-based network. Base transceiver stations 101–103 are operable to communicate with a plurality of mobile units (M) 111–114. Mobile units 111–114 may be any suitable cellular devices, including conventional cellular telephones, PCS handset devices, portable computers, metering devices, and the like.

Dotted lines show the approximate boundaries of the cells sites 121–123 in which base transceiver stations 101–103 are located. The cell sites are shown approximately circular for the purposes of illustration and explanation only. It should be clearly understood that the cell sites may have other shapes, such as hexagonal, depending on the cell configuration selected and natural and man-made obstructions.

BTS 101, BTS 102 and BTS 103 transfer voice and data signals between each other and the public telephone system (not shown) via communications line 131. Communications line 131 may be any suitable connection means, including a T1 line, a T3 line, a fiber optic link, a network backbone connection, and the like. In some embodiments, BTS 101, BTS 102 and BTS 103 may be wirelessly linked to one another and/or the public telephone network by a satellite link.

In the exemplary wireless network 100, mobile unit 111 is located in cell site 121 and is in communication with BTS 101, mobile unit 113 is located in cell site 122 and is in communication with BTS 102, and mobile unit 114 is located in cell site 123 and is in communication with BTS 103. The mobile unit 112 is located in cell site 121, close to the edge of cell site 123. The mobile unit 112 towards cell site 123. At some point as mobile unit 112 moves into cell site 123 and out of cell site 121, a "handoff" will occur.

A "handoff" is a well-known process for transferring control of a call from a first cell to a second cell. For example, if mobile unit 112 is in communication with BTS 101 and senses that the signal from BTS 101 is becoming unacceptably weak, mobile 112 may then switch to a BTS that has a stronger signal, such as the signal transmitted by BTS 103. Mobile unit 112 and BTS 103 establish a new communication link and a signal is sent to BTS 101 and the public telephone network to transfer the on-going voice and/or data signals through the BTS 103. The call is thereby seamlessly transferred from BTS 101 to BTS 103.

BTS 101, BTS 102, and BTS 103 transmit MAC messages in a forward control channel to the respective ones of mobile units 111, 112, 113 or 114 and receive MAC messages in a reverse control channel from the mobile units. The MAC messages are transmitted in MAC control channels and are used to establish, to maintain, and to break down the traffic channel communication links carrying the voice and/or data signals between the base transceiver stations and the mobile units. To ensure the reliability of the transfer of MAC messages between the base transceiver stations and the mobile units, MAC acknowledgment request systems in accordance with the principles of the present invention are implemented in both the base transceiver stations and the mobile units.

Figure 2:
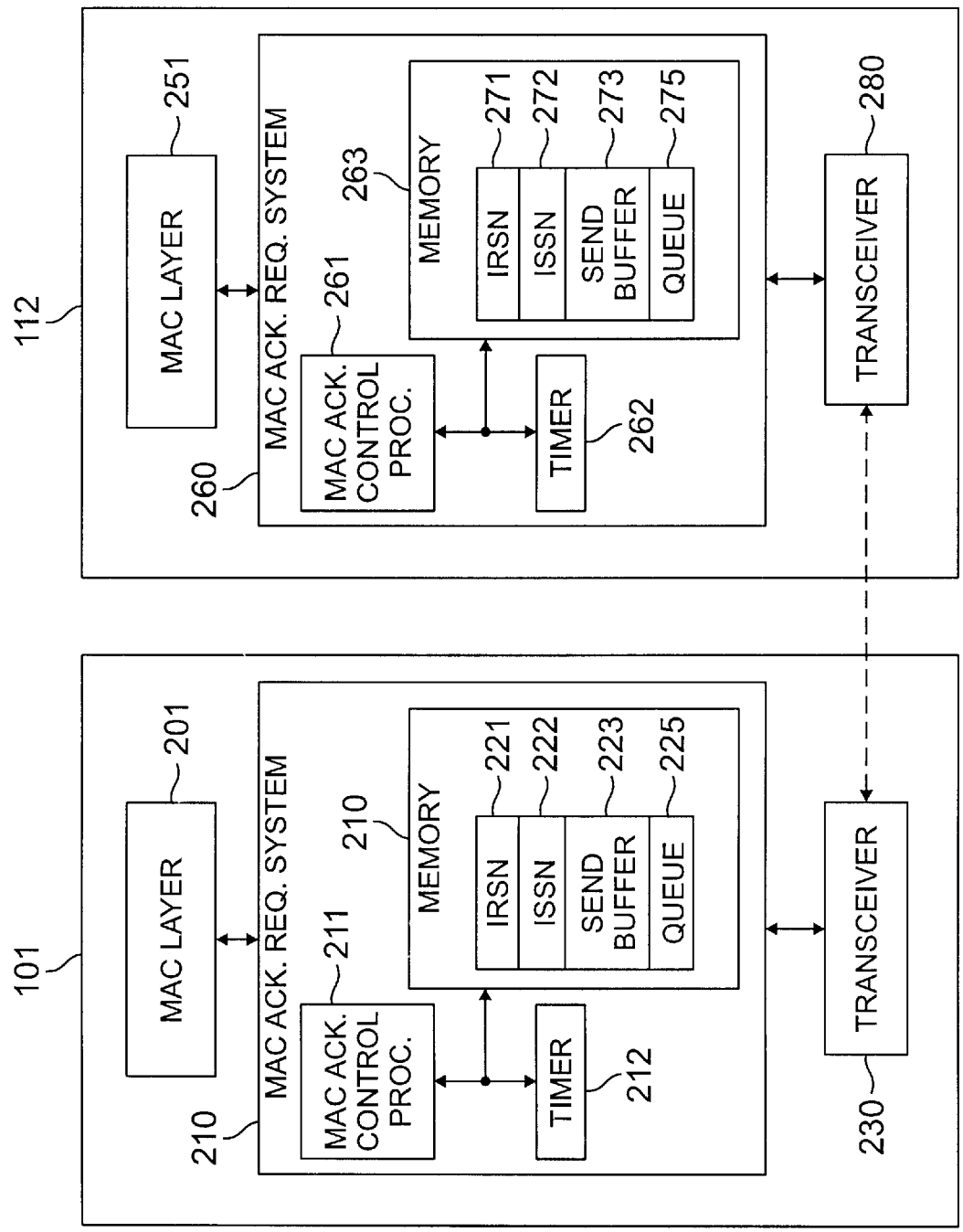
FIG. 2 illustrates an exemplary MAC acknowledgment request systems in a base transceiver station and a mobile unit according to one embodiment of the present invention.
Figure 3:
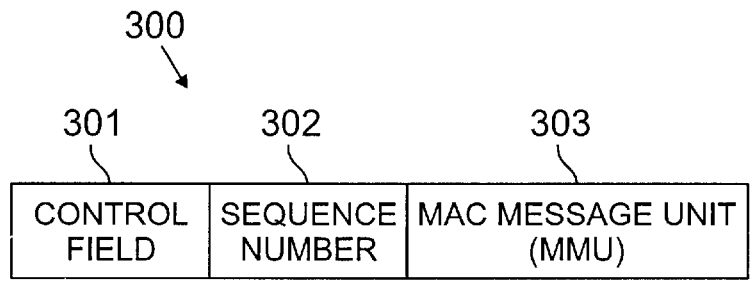
FIG. 3 illustrates an exemplary MAC message packet suitable for transmission between a base transceiver station and a mobile unit according to one embodiment of the present invention.

FIG. 2 illustrates exemplary MAC acknowledgment request systems 210 and 260 in base transceiver station 101 and mobile unit 112 according to one embodiment of the present invention. FIG. 3 illustrates an exemplary MAC message packet 300 suitable for transmission between base transceiver station 101 and mobile unit 112 according to one embodiment of the present invention. MAC message packet 300, which may be either an outgoing or an incoming packet, comprises control field 301, sequence number 302, and MAC message unit (MMU) 303, as explained below in greater detail. MAC acknowledgment request system 210 and 260 are responsible for reliably delivering MAC message packets between BTS 101 and mobile unit 112. MAC messages may originate in MAC layers 201 and 251 of either mobile unit 112 or BTS 101 and are transferred to transceivers 230 and 280 for transmission.

MAC acknowledgment request system 210 in BTS 101 comprises MAC acknowledgment control processor 211, timer 212, and memory 213. Memory 213 contains internal received sequence number (IRSN) 221, internal sent sequence number (ISSN) 222, send buffer 223, and queue 225. As explained below in greater detail, MAC acknowledgment request system 210 transfers MAC message units between the medium access control (MAC) layer 201 of BTS 101 and the transceiver system 230 of BTS 101.

Mobile unit 112 is comprised of similar components. MAC acknowledgment request system 260 in mobile unit 112 comprises MAC acknowledgment control processor 261, timer 262, and memory 263. Memory 263 contains internal received sequence number (IRSN) 271, internal sent sequence number (ISSN) 272, send buffer 273, and queue 275. MAC acknowledgment request system 260 transfers MAC message units between the medium access control (MAC) layer 251 of mobile unit 112 and the transceiver system 280 of mobile unit 112.

MAC acknowledgment request system 210 and MAC acknowledgment request system 260 perform mirror image functions in BTS 101 and mobile unit 112, respectively. This being the case, the operations of MAC acknowledgment request system 210 and MAC acknowledgment request system 260 are functionally identical. The operations of both systems can therefore be explained by explaining the operation of only one. For the sake of clarity and simplicity, the present invention will hereafter be explained principally, but not exclusively, in terms of the operation of MAC acknowledgment request system 210. It will be understood by those skilled in the art, however, that these descriptions also apply to MAC acknowledgment request system 260.

MAC acknowledgment request system 210 is an acknowledgment (ACK) based system that uses timer 212 to control the retransmission of MAC messages that are not acknowledged. In a preferred embodiment of the present invention, MAC acknowledgment request system 210 allows only one outstanding message (per instance) at any one time.

MAC acknowledgment control processor 211, which controls the operations of MAC acknowledgment request system 210, receives outgoing MAC message unit (MMU) 303 from MAC layer 201. MMU 303, whether incoming or outgoing, may contain a variable number of bits. MAC acknowledgment request system 210 attaches a header, comprising control field 301 and sequence number 302, to outgoing MMU 303, thus creating an outgoing MAC message packet similar to exemplary MAC message packet 300 in FIG. 3. Outgoing MAC message packet 300 is then sent to transceiver system 230 for transmission to mobile unit 112.

When MAC acknowledgment request system 210 receives incoming MAC message packet 300 from transceiver system 230, MAC acknowledgment control processor 211 strips off the header and sends the resulting incoming MAC message unit 303 to MAC layer 201.

In one embodiment of the present invention, the header consists of three (3) bits: a two-bit control field 301 and a one-bit sequence number 302. MMU 303 may be a variable number of bits in length, however, in a preferred embodiment of the present invention, MMU 303 is twenty-one (21) bits long. MAC acknowledgment control processor 211 maintains a 1-bit internal received sequence number (IRSN) 221 in memory 213 that holds the sequence number 302 of the last incoming MMU 303 that was sent to MAC layer 201. When MAC acknowledgment request system 210 receives incoming MAC message packet 300 containing incoming MMU 303, MAC acknowledgment control processor 211 compares sequence number 302 of new incoming MMU 303 to IRSN 221. Incoming MMU 303 is sent to MAC layer 201 only if sequence number 302 does not match IRSN 221. In this manner, if MAC message packet 300 is retransmitted because of a lost acknowledgment message, the same MAC message packet 300 will not be sent twice to MAC layer 201 by receiving MAC acknowledgment request system 210.

MAC acknowledgment control processor 211 also maintains a 1-bit internal sent sequence number (ISSN) 222 which indicates the sequence number 302 of the last message sent. In a preferred embodiment of the present invention of the present invention in which MAC acknowledgment request system 210 can have only one outstanding MAC message packet 300 at a time, a 1-bit sequence number 302 is sufficient to perform the foregoing operation. In alternate embodiments of the present invention, sequence number 302 may contain more than one bit in order to maintain a count of a larger number of outstanding MAC message packets 300.

The value in control field 301 determines the meaning of MMU 303 in each MAC message packet 300. A control field 301 value of "10" (binary) indicates to a receiving device that the current incoming MAC message packet 300 constitutes an acknowledgment from a transmitting device that the transmitting device has successfully received an MMU 303 previously transmitted by the receiving device and also indicates that the current incoming MAC message packet 300 does not contain a new incoming MMU 303 (the rest of MAC message packet 300 is padded with 0's)

A control field 301 value of "01" (binary) indicates to a receiving device that the current incoming MAC message packet 300 contains a new incoming MMU 303, but does not constitute an acknowledgment of an MMU 303 previously transmitted by the receiving device.

A control field 301 value of "11" (binary) indicates to a receiving device that the current incoming MAC message packet 300 contains a new incoming MMU 303 and also constitutes an acknowledgment from a transmitting device that the transmitting device has successfully received an MMU 303 previously transmitted by the receiving device.

A control field 301 value of "00" (binary) is a reserved value.

In general, MAC acknowledgment request system 210 may send/receive two types of acknowledgments: an acknowledgment may be sent just by itself (a "pure" acknowledgment having control field 301 set to "10"), or it may be "piggybacked" with a new MMU 303 (control field 301 set to "11"). If the acknowledgment is piggybacked on a new MMU 303, the sequence number 302 of the MAC message packet 300 refers to the sequence number 302 of the new MMU 303.

Since MAC acknowledgment request system 210 may receive an outgoing MMU 303 from MAC layer 201 while it already has an outgoing MAC message packet 300 outstanding (i.e., waiting for an acknowledgment), MAC acknowledgment control processor 211 uses queue 225 to store each outgoing MMU 303 until it can be serviced. In addition, MAC acknowledgment control processor 211 uses send buffer 223 to store the current outgoing MAC message packet 300 (i.e., a MAC message packet 300 that has not been sent nor acknowledged yet). Finally, MAC acknowledgment request system 210 uses timer 212 to dictate retransmissions of outstanding MAC message packets 300.

MAC acknowledgment request system 210 has two operating modes: Idle and Packet Outstanding. If MAC acknowledgment request system 210 is in Idle mode and receives an incoming MAC message packet 300 from transceiver 230, MAC acknowledgment control processor 211 strips the header off the received packet and checks the sequence number 302. If the sequence number 302 is different than IRSN 221, the MAC message packet 300 is a new message and the incoming MMU 303 contained therein is sent to MAC layer 201. IRSN 221 is then updated to be the sequence number 302 of the MAC message packet 300 just received.

If the sequence number 302 of the received MAC message packet 300 matches IRSN 221, the MAC message packet 300 is a retransmission of a message packet that has already been successfully received in BTS 101, and the MAC message packet 300 is discarded. The likely cause of the retransmission is the failure of mobile unit 112 to receive an acknowledgment of the first transmission of the message packet. ISSN 222 is not updated in this case.

In either case of the foregoing situations, MAC acknowledgment request system 210 sends a pure acknowledgment message (control field 301=10) to transceiver 230 for transmission to mobile unit 112.

If MAC acknowledgment request system 210 is in Idle mode and receives an outgoing MMU 303 from MAC layer 201, it updates ISSN 222 (flips the bit), and copies this value into the sequence number 302 of the header for the outgoing MAC message packet 300. Control field 301 of the header is set to "01" (no acknowledgment) After attaching the header to the outgoing MAC message packet 300, MAC acknowledgment control processor 211 copies the outgoing MAC message packet 300 into send buffer 223 and sends the outgoing MAC message packet 300 to transceiver 230 for transmission. MAC acknowledgment control processor 211 then starts the retransmission timer 212 and transitions to the Packet Outstanding State.

If, while in Packet Outstanding State, MAC acknowledgment request system 210 receives another outgoing MMU 303 from MAC layer 201, the outgoing MMU 303 is put in queue 225. If the retransmission timer 212 expires while MAC acknowledgment request system 210 is in the Packet Outstanding State, MAC acknowledgment control processor 211 retrieves the outgoing MAC message packet 300 currently in send buffer 223 and sends it to transceiver 230 for retransmission. In some embodiments of the present invention, whenever timer 212 expires, a counter in memory 213 may be incremented and, if the counter exceeds a pre-determined system value, error recovery procedures are started (reset and initialization).

If MAC acknowledgment request system 210 receives an acknowledgment while in Packet Outstanding State, MAC acknowledgment request system 210 flushes send buffer 223. Subsequent operations of MAC acknowledgment request system 210 depend on whether or not queue 225 is empty.

If queue 225 is empty, and MAC acknowledgment request system 210 receives a pure acknowledgment (control field 301=10), MAC acknowledgment request system 210 transitions to the Idle State. If the acknowledgment was piggybacked on a new incoming MMU 303 (control field 301=11), MAC acknowledgment control processor 211 strips the header off the incoming MAC message packet 300 and compares the sequence number 302 with IRSN 221. If the sequence numbers do not match, the new incoming MMU 303 is sent to MAC layer 201 and IRSN 221 is updated (the bit is flipped). If the numbers match, the MAC message packet 300 is discarded. In either case, MAC acknowledgment request system 210 then sends a pure acknowledgment message (control field 301=10) to transceiver 230. MAC acknowledgment request system 210 then transitions to the Idle State.

If queue 225 is not empty, and MAC acknowledgment request system 210 receives a pure acknowledgment message (control field 301=10), MAC acknowledgment control processor 211 retrieves the next outgoing MMU 303 from queue 225. After updating ISSN 222 (flipping the bit), the sequence number 302 in the header is set to the value of ISSN 222. Control field 301 is set to "01", the new outgoing MAC message packet 300 is stored in send buffer 223 and sent to transceiver 230, and timer 212 is reset.

If the acknowledgment was piggybacked on a new incoming MMU (control field 301=11), MAC acknowledgment control processor 211 first processes the incoming MAC message packet 300 as described above. MAC acknowledgment control processor 211 then retrieves the next outgoing MMU 303 from queue 225 and processes it as above, except that control field 301 is set to "11". The new outgoing MAC message packet 300 is stored in send buffer 223 and sent to transceiver 230, and timer 212 is reset. MAC acknowledgment request system 210 remains in the Packet Outstanding State.

If, while in Packet Outstanding State, MAC acknowledgment request system 210 receives an incoming MAC message packet 300 that does not contain an acknowledgment, MAC acknowledgment control processor 211 strips the header from the incoming MAC message packet 300 and sends the incoming MMU 303 to MAC layer 201 (after checking sequence number 302 against IRSN 221). A pure MAC acknowledgment message (control field 301=10) is then sent to transceiver 230. No further action is taken in this case.

Figure 4:
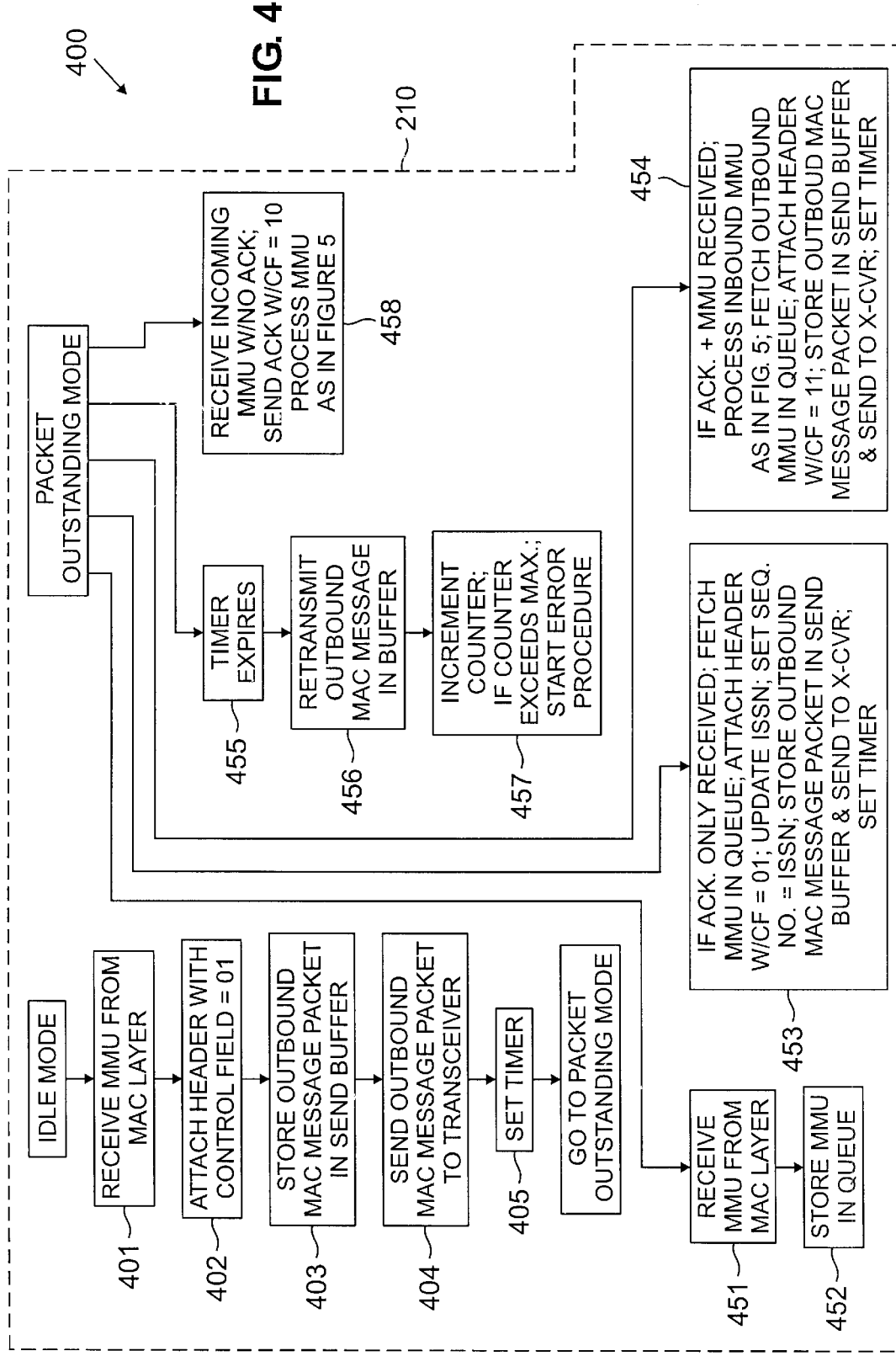
FIG. 4 is a flow diagram illustrating the operation of an exemplary MAC acknowledgment request system according to one embodiment of the present invention.

FIG. 4 is a flow diagram 400 illustrating the operation of an exemplary MAC acknowledgment request system 210 during receipt of an incoming MMU from MAC layer 201 according to one embodiment of the present invention. Both Idle mode and Packet Outstanding mode are depicted. While MAC acknowledgment request system 210 is in Idle mode, an MMU 303 is initially received from MAC layer 201 (process step 401). MAC acknowledgment request system 210 attaches a header to newly received MMU 303 and sets control field 301 to "01" (process step 402). Next, MAC acknowledgment request system 210 stores a copy of the outbound MAC message packet 300 in send buffer 223 (process step 403) and also sends the outbound MAC message packet 300 to transceiver 230 (process step 404).

MAC acknowledgment request system 210 then sets timer 212 to a predetermined system value that establishes the time period that MAC acknowledgment request system 210 will wait for a response to the outbound MAC message packet 300 (process step 405). Once the outbound MAC message packet has been passed to transceiver 230, MAC acknowledgment request system 210 enters the Packet Outstanding mode.

While MAC acknowledgment request system 210 is in Packet Outstanding mode, an MMU 303 may be received from MAC layer 201 (process step 451). Because MAC acknowledgment request system 210 is still waiting to receive an acknowledgment message for the presently outstanding MAC message packet, the newly received MMU 303 is stored in queue 225 (process step 452). At this point, MAC acknowledgment request system 210 waits until an acknowledgment message is received from mobile unit 112.

If an acknowledgment message only is received, MAC acknowledgment request system 210 takes the following actions. MAC acknowledgment request system 210 fetches MMU 303 from queue 225, attaches a header with control field="01", updates ISSN 222, and sets sequence number 302 equal to ISSN 222. MAC acknowledgment request system 210 then stores a copy of the outbound MAC message packet 300 in send buffer 223 and sends the outbound MAC message packet 300 to transceiver 230. Finally, MAC acknowledgment request system 210 sets timer 212 to wait for a response to the outbound MAC message packet 300 (process step 453).

If MAC acknowledgment request system 210 receives an acknowledgment message that also contains a new inbound MMU 303 from mobile unit 112, MAC acknowledgment request system 210 takes the following actions. MAC acknowledgment request system 210 first processes the newly received inbound MMU 303 from mobile unit 112 as in FIG. 5. Next, MAC acknowledgment request system 210 fetches the outbound MMU 303 from queue 225 and attaches a header with control field="11". MAC acknowledgment request system 210 then stores a copy of the outbound MAC message packet 300 in send buffer 223 and also sends the outbound MAC message packet 300 to transceiver 230. Finally, MAC acknowledgment request system 210 sets timer 212 to establish the waiting period for a response acknowledgment from mobile unit 112 (process step 454).

While MAC acknowledgment request system 210 is in Packet Outstanding mode, timer 212 may expire (process step 455). MAC acknowledgment request system 210 responds by re-transmitting the outbound MAC message packet 300 in send buffer 223 (process step 456). MAC acknowledgment request system 210 then increments the error counter. If the error counter exceeds a maximum allowed value, error procedures are initiated (process step 457).

Figure 5:
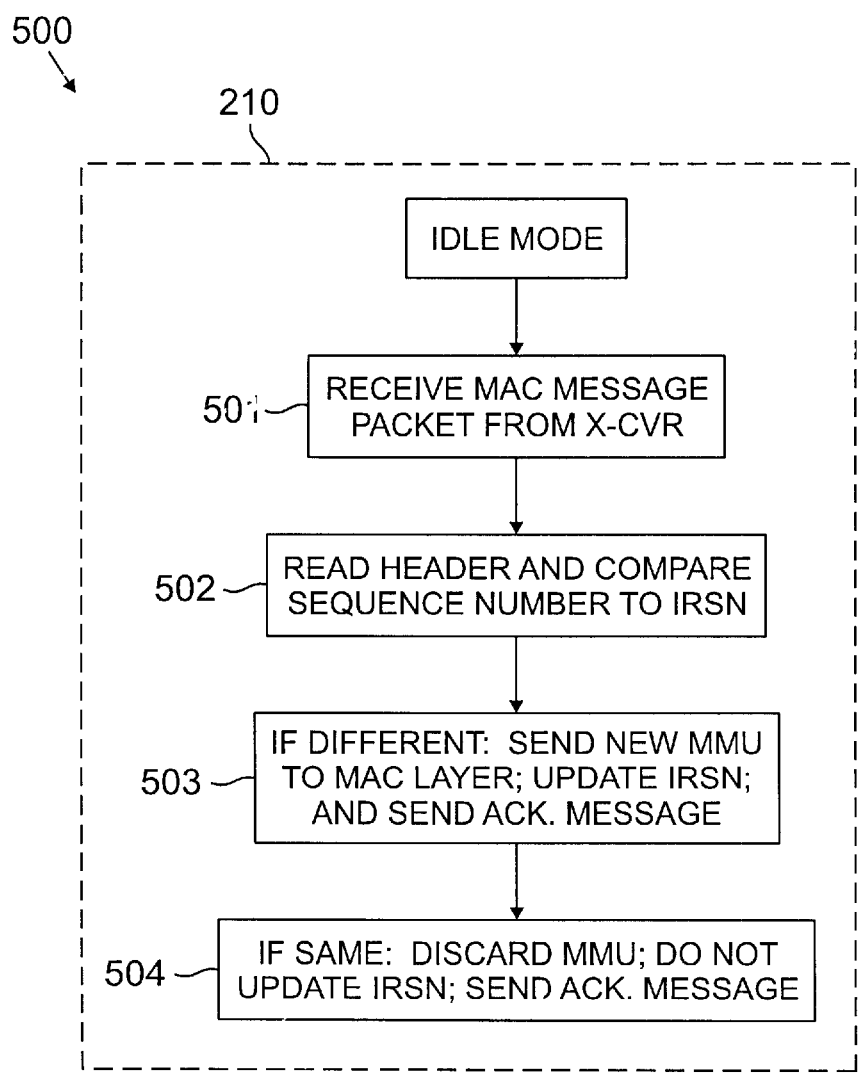
FIG. 5 is a flow diagram 500 illustrating the operation of an exemplary MAC acknowledgment request system during receipt of a MAC message packet from another wireless device according to one embodiment of the present invention.

If an incoming MMU 303 is received without an acknowledgment message while MAC acknowledgment request system 210 is in Packet Outstanding mode, MAC acknowledgment request system 210 responds by sending back an acknowledgment message with control field 301 set to "10" and processes the incoming MMU 303 as in FIG. 5 (process step 458).

FIG. 5 is a flow diagram 500 illustrating the operation of an exemplary MAC acknowledgment request system 210 during reception of a MAC message packet 300 from mobile unit 112 according to one embodiment of the present invention. Initially, MAC acknowledgment request system 210 is in Idle mode. Idle mode is interrupted when MAC acknowledgment request system. 210 receives a MAC message packet 300 from transceiver 230 (process step 501). MAC acknowledgment request system 210 reads the header of the received MAC message packet 300 and compares the sequence number 302 therein to the IRSN 221 in memory 213 (process step 502).

If the sequence number 302 and IRSN 221 are different, MAC acknowledgment request system 210 sends the newly received MMU 303 to MAC layer 201, and updates the value of IRSN 221. MAC acknowledgment request system 210 then sends an acknowledgment message back to mobile unit 112 via transceiver 230 (process step 503). If the sequence number 302 and IRSN 221 are the same, MAC acknowledgment request system 210 discards the redundant MMU 303 and does not update IRSN 221. MAC acknowledgment request system 210 then sends an acknowledgment message back to mobile unit 112 via transceiver 230 (process step 504)

Although the present invention has been described in detail, those skilled in the art should understand that they can make various changes, substitutions and alterations herein without departing from the spirit and scope of the invention in its broadest form.

What is claimed is:

1. For use in a wireless communications device, a medium access control (MAC) message acknowledgment system for acknowledging MAC messages transmitted in an RF control channel between said wireless communications device and a remote communications unit, said MAC message acknowledgment system allowing only one outstanding MAC message at any one time, said MAC message acknowledgment system comprising:

a control processor capable of receiving an outbound MAC message unit from a MAC layer device in said wireless communications device and attaching a header to said outbound MAC message unit to thereby form an outbound MAC message suitable for transmission to said remote communications unit, said header comprising:

a two bit control field containing logic bits that signify one of: whether an acknowledgment of receipt of a MAC message has been received and whether a new MAC message is present; and a one bit sequence number that identifies said only one outstanding MAC message wherein said header identifies said outbound MAC message unit to said remote communications device to thereby enable said remote communications unit to acknowledge receipt of said outbound MAC message.

2. The MAC message acknowledgment system set forth in claim 1 further comprising a timer coupled to and controllable by said control processor, wherein said timer controls a delay period during which said MAC message acknowledgment system waits before re-transmitting said outbound MAC message.

3. The MAC message acknowledgment system set forth in claim 1 further comprising a memory coupled to and controllable by said control processor, wherein said control processor stores said outbound MAC message in said memory if a receipt of a previously transmitted MAC message has not been acknowledged by said remote communications unit; and wherein said memory stores a value of an internal received sequence number for an incoming MAC message and wherein said memory stores a value of an internal sent sequence number for an outgoing MAC message.

4. The MAC message acknowledgment system set forth in claim 1 wherein said wireless communications device is a mobile device.

5. The MAC message acknowledgment system set forth in claim 1 wherein said wireless communications device is a base transceiver station in a wireless network.

6. The MAC message acknowledgment system set forth in claim 1 wherein said control processor is capable of receiving from a transceiver an inbound MAC message transmitted by said remote communications unit.

7. The MAC message acknowledgment system set forth in claim 6 wherein said control processor detects an embedded header in said received inbound MAC message and uses said embedded header to acknowledge to said remote communications unit a receipt of an embedded MAC message unit in said received inbound MAC message, wherein said embedded header comprises:

a two bit control field containing logic bits that signify one of: whether an acknowledgment of receipt of a MAC message has been received and whether a new MAC message is present; and a one bit sequence number that identifies said inbound MAC message unit wherein said embedded header identifies said inbound MAC message unit from said remote communications device to thereby enable said MAC message acknowledgment system to acknowledge receipt of said inbound MAC message.

8. The MAC message acknowledgment system set forth in claim 7 wherein said control processor modifies a header in a second outbound MAC message in order to acknowledge receipt of said received inbound MAC message, said header comprising:

a two bit control field containing logic bits that signify one of: whether an acknowledgment of receipt of a MAC message has been received and whether a new MAC message is present; and a one bit sequence number that identifies said second outbound MAC message.

9. A wireless communications network comprising:

a plurality of base transceiver stations capable of communicating with mobile stations disposed in a coverage area of said wireless communications network, wherein at least one of said plurality of base transceiver stations comprises:

a medium access control (MAC) message acknowledgment system for acknowledging MAC messages transmitted in an RF control channel between said at least one base station transceiver and a selected on one of said mobile stations, said MAC message acknowledgment system allowing only one outstanding MAC message at any one time, said MAC message acknowledgment system comprising:

a control processor capable of receiving an outbound MAC message unit from a MAC layer device in at least one base station transceiver and attaching a header to said outbound MAC message unit to thereby form an outbound MAC message suitable for transmission to said selected mobile station, said header comprising:

a two bit control field containing logic bits that signify one of: whether an acknowledgment of receipt of a MAC message has been received and whether a new MAC message is present; and a one bit sequence number that identifies said only one outstanding MAC message wherein said header identifies said outbound MAC message unit to said selected mobile station to thereby enable said selected mobile station to acknowledge receipt of said outbound MAC message.

10. The wireless communications network set forth in claim 9 wherein said MAC message acknowledgment system further comprises a timer coupled to and controllable by said control processor, wherein said timer controls a delay period during which said MAC message acknowledgment system waits before re-transmitting said outbound MAC message.

11. The wireless communications network set forth in claim 9 wherein said MAC message acknowledgment system further comprises a memory coupled to and controllable by said control processor, wherein said control processor stores said outbound MAC message in said memory if a receipt of a previously transmitted MAC message has not been acknowledged by said selected mobile station; and wherein said memory stores a value of an internal received sequence number for an incoming MAC message and wherein said memory stores a value of an internal sent sequence number for an outgoing MAC message.

12. The wireless communications network set forth in claim 9 wherein said MAC message acknowledgment system is capable of receiving from a transceiver in said base transceiver station an inbound MAC message transmitted by said selected mobile station.

13. The wireless communications network set forth in claim 12 wherein said control processor detects an embedded header in said received inbound MAC message and uses said embedded header to acknowledge to said selected mobile station a receipt of an embedded MAC message unit in said received inbound MAC message, wherein said embedded header comprises:

a two bit control field containing logic bits that signify one of: whether an acknowledgment of receipt of a MAC message has been received and whether a new MAC message is present; and a one bit sequence number that identifies said inbound MAC message unit wherein said embedded header identifies said inbound MAC message unit from said selected mobile station to thereby enable said MAC message acknowledgment system to acknowledge receipt of said inbound MAC message.

14. The wireless communications network forth in claim 13 wherein said control processor modifies a header in a second outbound MAC message in order to acknowledge receipt of said received inbound MAC message, said header comprising:

a two bit control field containing logic bits that signify one of: whether an acknowledgment of receipt of a MAC message has been received and whether a new MAC message is present; and a one bit sequence number that identifies said second outbound MAC message.

15. The wireless communications network set forth in claim 14 wherein said second outbound MAC message contains a second outbound MAC message unit received from said MAC layer device.

16. The wireless communications network set forth in claim 12 wherein said MAC message acknowledgment system sends said received inbound MAC message to said MAC layer device.

17. For use a wireless communications device, a method of acknowledging MAC messages transmitted in an RF control channel between the wireless communications device and a remote communications unit, the method comprising the steps of:

receiving an outbound MAC message unit from a MAC layer device in the wireless communications device; and attaching a header to the outbound MAC message unit to thereby form an outbound MAC message suitable for transmission to the remote communications unit, the header comprising:

a two bit control field containing logic bits that signify one of: whether an acknowledgment of receipt of a MAC message has been received and whether a new MAC message is present; and a one bit sequence number that identifies only one outstanding MAC message wherein said header identifies the outbound MAC message unit to the remote communications device to thereby enable the remote communications unit to acknowledge receipt of the outbound MAC message.

18. The method set forth in claim 17 including the further steps of:

comparing a value of an internal received sequence number with a sequence number of an inbound MAC message; and sending an inbound MAC message unit of said inbound MAC message to said MAC layer of said wireless communications device if said internal received sequence number does not match said sequence number of said inbound MAC message.

19. The method set forth in claim 17 wherein the wireless communications device is a mobile communications device.

20. The method set forth in claim 17 wherein the wireless communications device is a base transceiver station in a wireless communications network.

\* \* \* \* \*

UNITED STATES PATENT AND TRADEMARK OFFICE
CERTIFICATE OF CORRECTION

PATENT NO.     : 6,546,001 B1
DATED          : April 8, 2003
INVENTOR(S)    : William J. Semper and Hyunseok Lee It is certified that error appears in the above-identified patent and that said Letters Patent is hereby corrected as shown below:

Column 4,
Line 40, delete "The mobile unit 112 towards cell site 123" and replace with
-- The direction arrow proximate mobile unit 112 indicates the movement of mobile unit 112 towards cell site 123 --;

Column 9,
Line 67, delete "." after "system".

Signed and Sealed this

Twenty-seventh Day of December, 2005

JON W. DUDAS
*Director of the United States Patent and Trademark Office*